(12) United States Patent
Joseph et al.

(10) Patent No.: US 10,489,214 B2
(45) Date of Patent: Nov. 26, 2019

(54) SYSTEM AND METHOD FOR APPLICATION DEPLOYMENT IN CLOUD

(71) Applicant: Dell Products L.P., Round Rock, TX (US)

(72) Inventors: Jerish Joseph, Bangalore (IN); Sridhar Mudugu, Bangalore (IN); Kameswara Rao K. N. V., Hyderbad (IN); Mahesh Gidwani, Bangalore (IN); Sundar Varada Raj Perangur, Bangalore (IN); Priyatham Sundar, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 642 days.

(21) Appl. No.: 13/679,536

(22) Filed: Nov. 16, 2012

(65) Prior Publication Data

US 2014/0143422 A1 May 22, 2014

(51) Int. Cl.
 G06F 9/50 (2006.01)
 G06F 8/60 (2018.01)
 H04L 12/24 (2006.01)

(52) U.S. Cl.
 CPC ............ G06F 9/5077 (2013.01); G06F 8/60 (2013.01); G06F 9/5066 (2013.01); G06F 9/5072 (2013.01); H04L 41/5041 (2013.01)

(58) Field of Classification Search
 CPC ...... G06F 9/455; G06F 9/5077; G06F 9/5066; G06F 8/60; H04L 41/5041
 USPC ....................................................... 709/226
 See application file for complete search history.

(56) References Cited

U.S. PATENT DOCUMENTS

| | | | |
|---|---|---|---|
| 8,434,080 B2 | 4/2013 | Yendluri | |
| 2011/0126218 A1* | 5/2011 | Kishita | G06F 9/545 719/321 |
| 2012/0084607 A1* | 4/2012 | Lam | G06F 11/368 714/38.1 |
| 2012/0311568 A1 | 12/2012 | Jansen | |
| 2013/0007216 A1 | 1/2013 | Fries et al. | |
| 2013/0232463 A1* | 9/2013 | Nagaraja | G06F 8/61 717/101 |

FOREIGN PATENT DOCUMENTS

EP 2251783 A1 11/2010

* cited by examiner

*Primary Examiner* — Emmanuel L Moise
*Assistant Examiner* — Xiang Yu
(74) *Attorney, Agent, or Firm* — Winstead PC

(57) ABSTRACT

In one embodiment, a method includes receiving one or more deployment units for an application to be deployed. The method further includes receiving a selection of a deployment topology for the application. The deployment topology specifies one or more virtual machines (VMs). In addition, the method includes providing a list of VM templates. The list includes one or more VM templates for each of a plurality of cloud providers. Further, the method includes receiving a selection of at least one VM template from the list for each of the one or more VMs. The method additionally includes matching the one or more deployment units to the at least one VM template. The method also includes deploying the application on a computer system of a selected cloud provider from the plurality of cloud providers.

20 Claims, 9 Drawing Sheets

SYSTEM AND METHOD FOR APPLICATION DEPLOYMENT IN CLOUD

BACKGROUND

Technical Field

The present invention relates generally to application deployment and more particularly, but not by way of limitation, to systems and methods for application deployment in a cloud environment.

History of Related Art

As technology advances, an enterprise is often presented with opportunities to improve upon or modernize its legacy data, applications, and services. One such example is that of migration to a cloud environment. Traditionally, the enterprise's data, applications, and services are maintained on-premises behind a firewall. With the recent proliferation of cloud-based solutions, it has become apparent that capital and operational expenditures can be reduced by migrating all or part of the enterprise's data, applications, and services to the cloud.

Cloud computing generally involves the use of computing resources (hardware and software) that are delivered as a service over a network such as the Internet. Accordingly, as used herein, a cloud or a cloud environment refers to a services environment to which the enterprise can entrust all or part of its data, applications and services. In addition to cost savings, cloud migration potentially provides numerous other advantages such as dynamic scaling, high availability, multi-tenancy, and effective resource allocation.

The enterprise wishing to migrate to the cloud generally begins by selecting a cloud provider. The enterprise then works with the cloud provider to deploy all or part of its data, applications, and services in the cloud. The deployment typically entails substantial manual configuration using an application programming interface (API) of the cloud provider. As cloud computing continues to evolve, oftentimes, it later becomes apparent that the enterprise would be better served by a solution offered by a second cloud provider. However, there is generally not a streamlined way for the enterprise to migrate from a cloud environment of a first cloud provider to a cloud environment of the second cloud provider. This problem is often referred to as cloud-provider lock-in. The migration to the second cloud provider usually requires more manual configurations using separate APIs offered by the first cloud provider and the second cloud provider. Consequently, the enterprise often does not switch cloud providers even when it otherwise makes sense to do so.

Moreover, as the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

SUMMARY OF THE INVENTION

In one embodiment, a method includes, on a computer system comprising at least one server computer, receiving one or more deployment units for an application to be deployed. The method further includes receiving, by the computer system, a selection of a deployment topology for the application, the deployment topology specifying one or more virtual machines (VMs). In addition, the method includes providing, by the computer system, a list of VM templates. The list includes one or more VM templates for each of a plurality of cloud providers. Further, the method includes receiving, by the computer system, a selection of at least one VM template from the list for each of the one or more VMs. The method additionally includes matching, by the computer system, the one or more deployment units to the at least one VM template. The method also includes deploying, by the computer system, the application on a computer system of a selected cloud provider from the plurality of cloud providers.

In one embodiment, an information handling system includes at least one server computer. The at least one server computer is operable to receive one or more deployment units for an application to be deployed. The at least one server computer is further operable to receive a selection of a deployment topology for the application, the deployment topology specifying one or more virtual machines (VMs). In addition, the at least one server computer is operable to provide a list of VM templates, the list comprising one or more VM templates for each of a plurality of cloud providers. Further, the at least one server computer is operable to receive a selection of at least one VM template from the list for each of the one or more VMs. The at least one server computer is also operable to match the one or more deployment units to the at least one VM template. Additionally, the at least one server computer is operable to deploy the application on a computer system of a selected cloud provider from the plurality of cloud providers.

In one embodiment, a computer-program product includes a computer-usable medium having computer-readable program code embodied therein, the computer-readable program code adapted to be executed to implement a method. The method includes receiving one or more deployment units for an application to be deployed. The method further includes receiving a selection of a deployment topology for the application. The deployment topology specifies one or more virtual machines (VMs). In addition, the method includes providing a list of VM templates. The list includes one or more VM templates for each of a plurality of cloud providers. Further, the method includes receiving a selection of at least one VM template from the list for each of the one or more VMs. The method additionally includes matching the one or more deployment units to the at least one VM template. The method also includes deploying the application on a computer system of a selected cloud provider from the plurality of cloud providers.

BRIEF DESCRIPTION OF THE DRAWINGS

A more complete understanding of the method and apparatus of the present invention may be obtained by reference to the following Detailed Description when taken in conjunction with the accompanying Drawings wherein.

DETAILED DESCRIPTION OF ILLUSTRATIVE EMBODIMENTS OF THE INVENTION

In various embodiments, a risk of cloud-provider lock-in can be mitigated via a cloud-middleware platform that interacts with a deployment user to deploy an application in a cloud environment. Application deployment, as used herein, refers to a process for making the application ready for use. A deployment user, as used herein, is a system user who attempts to accomplish application deployment as described above. A deployment user may, for example, represent an enterprise.

In a typical embodiment, the cloud-middleware platform can be disposed between an enterprise and a cloud-provider system on a network. The middleware platform provides the enterprise a single point-of-access to a plurality of cloud providers. In a typical embodiment, the middleware platform includes adapters that communicate with separate APIs of a plurality of cloud providers in a fashion that is transparent to the enterprise. In addition, the adapters can be utilized to automatically perform configurations that traditionally must be performed manually via an API of a cloud provider.

Figure 1:
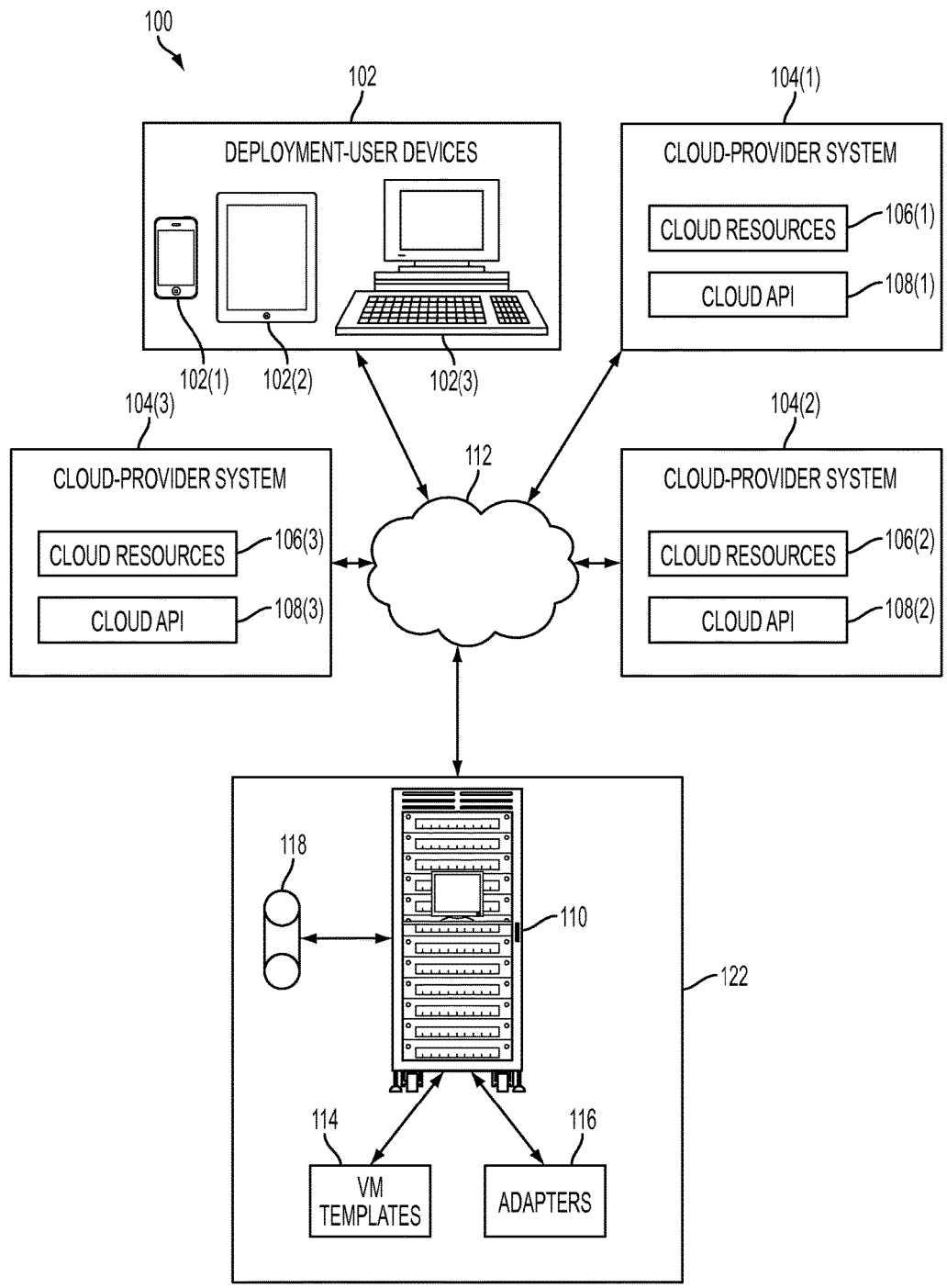
FIG. 1 illustrates a system for application deployment in a cloud environment.

FIG. 1 illustrates a system 100 for application deployment in a cloud environment. The system 100 includes a plurality of deployment-user devices 102, a cloud-provider system 104(1), a cloud-provider system 104(2), a cloud-provider system 104(3), and a cloud-middleware platform 122. For convenient reference, the cloud-provider system 104(1), the cloud-provider system 104(2), and the cloud-provider system 104(3) may be collectively referenced as a plurality of cloud-provider systems 104. It should be appreciated that that the cloud-provider systems 104(1), 104(2), and 104(3) are depicted for illustrative purposes. In practice, the system 100 can include any number of cloud-provider systems. The plurality of cloud-provider systems 104, the cloud-middleware platform 122, and the plurality of deployment-user devices 102 are each connected to a network 112 such as, for example, the Internet. One or more intermediate communications networks such as, for example, a cellular telephone network, may be disposed between a given device and the network 112.

The plurality of deployment-user devices 102 can be any type of computing device that is capable of communicating over a network such as, for example, the network 112. By way of example, the plurality of deployment-user devices 102 is shown to include a smartphone 102(1), a tablet computer 102(2), and a desktop computer 102(3). One of ordinary skill in the art will appreciate that other types of devices may also be utilized without deviating from the principles described herein.

The cloud-provider systems 104(1), 104(2), and 104(3) provide cloud resources 106(1), cloud resources 106(2), and cloud resources 106(3), respectively, and a cloud API 108 (1), a cloud API 108(2), and a cloud API 108(3), respectively. For convenient reference, the cloud resources 106(1), the cloud resources 106(2), and the cloud resources 106(3) may be collectively referenced as cloud resources 106. Similarly, for convenient reference, the cloud API 108(1), the cloud API 108(2), and the cloud API 108(3) may be collectively referenced as cloud APIs 108.

The cloud resources 106 generally include hardware and software computing resources that are provided as a service by the plurality of cloud-provider systems 106. The cloud resources 106 can include, for example, computers (e.g., physical computers or virtual machines (VMs)), raw (block) and file-based storage, firewalls, load balancers, internet protocol (IP) addresses, virtual local area networks (VLANs), software bundles, and computing platforms that typically include an operating system, a programming-language execution environment, a database, and a web server. As one of ordinary skill in the art will appreciate, the cloud resources 106 are generally offered according to deployment models defined by specific business, operational, and technical requirements. Examples of common deployment models are private cloud, public cloud, community cloud, and hybrid cloud.

The cloud-provider APIs 108 are used to build applications in cloud environments provided by respective cloud-provider systems of the plurality of cloud-provider systems 104. The cloud-provider APIs 108 typically allow data and computations to be requested from respective cloud-provider systems of the plurality of cloud-provider systems 104. In a typical embodiment, the cloud-provider APIs 108 expose features thereof via, for example, Representational State Transfer (REST) and/or Simple Object Access Protocol (SOAP).

The cloud-middleware platform 122 includes at least one server computer 110 that maintains a plurality of virtual-machine (VM) templates 114, a plurality of adapters 116, and at least one database 118. In various embodiments, the cloud-middleware platform 122 may be offered as a platform as a service (PaaS) solution on a cloud-provider system, such as, for example, a cloud-provider system of the plurality of cloud-provider systems 104. In these embodiments, the at least one server computer 110 and the at least one database 118 may each comprise one or more VMs. In various other embodiments, the cloud-middleware platform 122 may comprise one or more physical computers.

In a typical embodiment, the VM templates 114 establish a baseline definition of virtual machines that can be used to run a deployed application. More particularly, the VM templates 114 correspond to virtual-machine images that package a pre-configured operating-system environment with application software operable to provide a specific set of services. For purposes of this patent application, a VM based on a given VM template in the VM templates 114 will be referred to as a VM instance of the given VM template. Each of the VM templates 114 is typically mapped to a virtual-machine type supported by one of the plurality of cloud-computer systems 104.

As one of ordinary skill in the art will appreciate, the plurality of cloud-provider systems 104 each generally support a plurality of virtual-machine types. The plurality of cloud-provider systems 104 also generally specify guidelines for virtualized resources such as, for example, CPUs, RAM, storage, and networking, that will be provisioned to virtual machines of each virtual-machine type. For example, some of the cloud-provider systems 104 may offer specific classes of virtualized resources that gradually increase in a tiered fashion. Each of the VM templates 114 typically specifies virtualized resources that are based on, for example, the specific classes described above.

In a typical embodiment, each adapter of the adapters 116 programmatically provides an interface for communicating with a cloud API of the cloud APIs 108. As described in greater detail with respect to FIG. 2, the cloud-middleware platform 122 provides a set of standard deployment functionality over a standard interface to the plurality of deployment-user devices 102. Each adapter of the adapters 116 is operable to translate the set of standard functionality into calls to one or more of the cloud APIs 108.

The at least one database 118 includes cloud-provider settings such as, for example, pricing information and deployment rules for each of the plurality of cloud-provider systems 104. In various embodiments, the VM templates 114 and/or the adapters 116 may be maintained in the at least one database 118. The pricing information typically includes criteria for computing, for each cloud-provider system of the plurality of cloud-provider systems 104, a total cost of ownership (TCO). The TCO can be based on, for example, the virtualized-resource guidelines described above. The deployment rules typically include rules for determining, for each cloud-provider system of the plurality of cloud-provider systems 104, whether a given application can be validly deployed on the cloud-provider system. Examples of the deployment rules will be described in greater detail with respect to FIG. 9.

The at least one server computer 110 serves the standard interface to the plurality of deployment-user devices 102 over the network 112. In various embodiments, the at least one server computer 110 functions as a web server that serves web pages over the network 112 to the plurality of deployment-user devices 102. In these embodiments, the plurality of deployment-user devices 102 each communicate with the at least one server computer 110 via a web browser. In addition, in various embodiments, the at least one server computer 110 is operable to interact with a platform-specific native application loaded onto a computing device. For example, the smartphone 102(1) or the tablet computer 102(2) can have a native application loaded thereon that performs processing on the device in question and communicates with the at least one server computer 110.

Other potential implementations based on the teachings herein will be apparent to one of ordinary skill in the art. For simplicity of reference, information or data may be described herein as being sent or received by a deployment user or a cloud provider without specific reference to a particular device or system such as, for example, the plurality of deployment-user devices 102 or the plurality of cloud-provider systems 106. Functionality relative to deployment users and cloud providers will be described in more detail below with respect to FIGS. 2-9.

Figure 2:
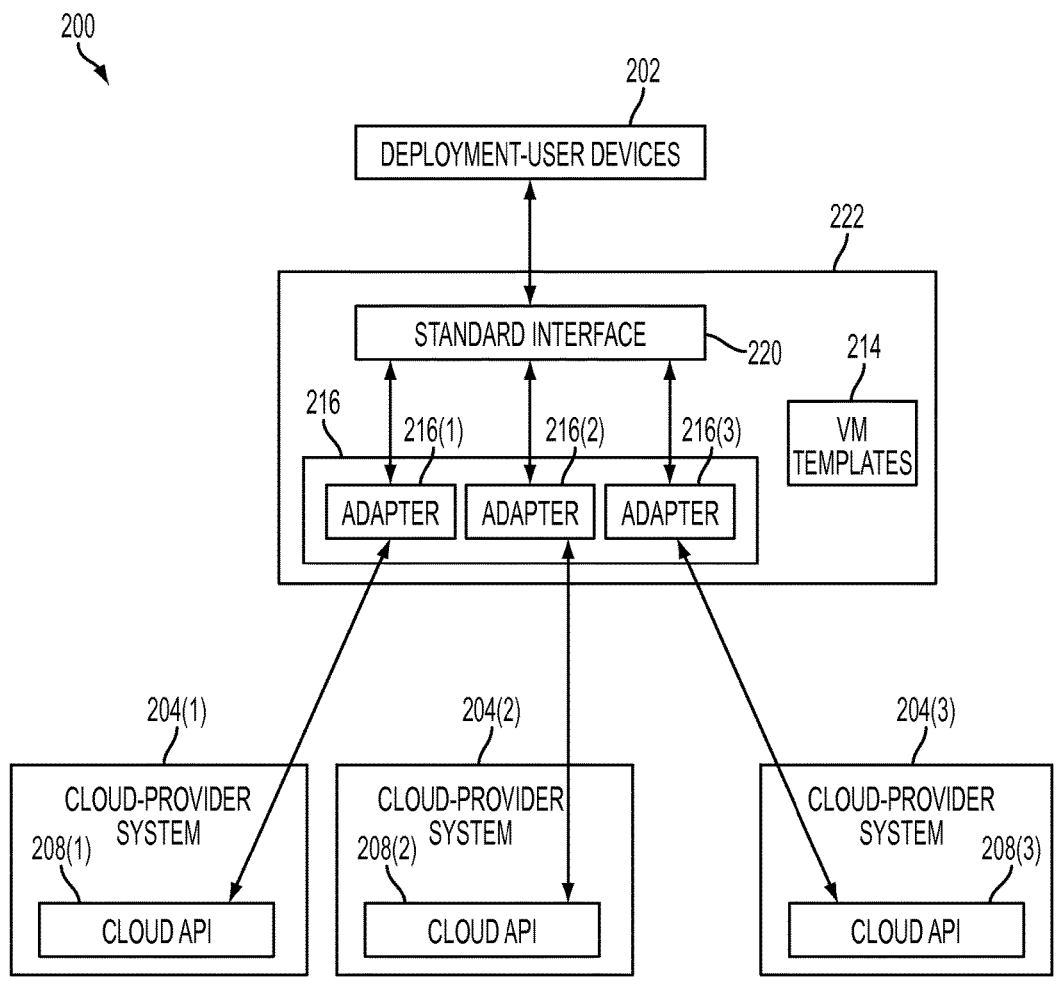
FIG. 2 illustrates a system for application deployment in a cloud environment.

FIG. 2 illustrates a system 200 for application deployment in a cloud environment, with particular focus on functionality provided by a cloud-middleware platform 222. The system 200 includes a plurality of deployment-user devices 202, a cloud-provider system 204(1), a cloud-provider system 204(2), a cloud-provider system 204(3), and the cloud-middleware platform 222. For convenient reference, the cloud-provider systems 204(1), 204(2), and 204(3) may be referenced collectively as a plurality of cloud-provider systems 204. It should be appreciated that that the cloud-provider systems 204(1), 204(2), and 204(3) are depicted for illustrative purposes. In practice, the system 200 can include any number of cloud-provider systems. In a typical embodiment, the plurality of deployment-user devices 202, the cloud-middleware platform 222, and the plurality of cloud-provider systems 204 operate similarly to the plurality of deployment-user devices 104, the cloud-middleware platform 122, and the plurality of cloud-provider systems 104, respectively, of FIG. 1.

The cloud-middleware platform 222 includes a standard interface 220 that utilizes adapters 216. The adapters 216 include an adapter 216(1), an adapter 216(2), and an adapter 216(3). The cloud-middleware platform 222 further includes VM templates 214. In a typical embodiment, the VM templates 214 and the adapters 216 operate similarly to the VM templates 114 and the adapters 116, respectively, of FIG. 1. The cloud-provider systems 204(1), 204(2), and 204(3) include a cloud API 208(1), a cloud API 208(2), and a cloud API 208(3), respectively.

The standard interface 220 provides the plurality of deployment-user devices 202 access to a set of standard functionality operable to deploy a given application on any of the plurality of cloud-provider systems 204. The standard interface 220 can be, for example, a web interface as described with respect to FIG. 1. As shown, the adapters 216(1), 216(2), and 216(3) programmatically translate the set of standard functionality into calls to the cloud API 208(1), the cloud API 208(2), and the cloud API 208(3), respectively. Specific examples of the standard functionality that can be provided by the standard interface 220 will be described in greater detail with respect to FIGS. 3-8.

Figure 3:
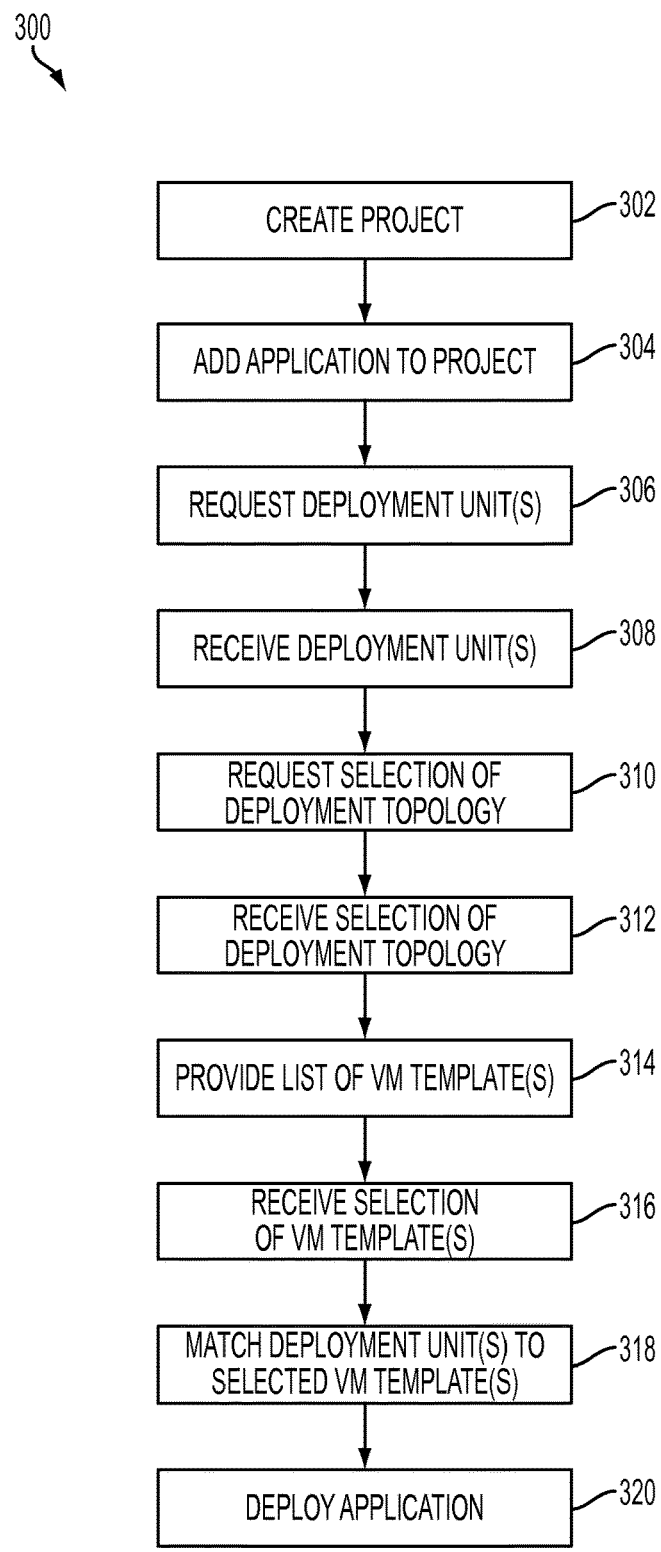
FIG. 3 illustrates a process for deploying an application in a cloud environment.

FIG. 3 illustrates a process 300 for deploying an application in a cloud environment. In a typical embodiment, the process 300 is performed by a system that is in communication with a deployment user. The system may be, for example, the cloud-middleware platform 122 of FIG. 1 or the cloud-middleware platform 222 of FIG. 2. The process 300 begins at step 302. At step 302, the system creates a project. In a typical embodiment, the project is used as a logical container for one or more applications to be deployed in an environment of a cloud provider specified by the deployment user. The project is typically created responsive to an indication from the deployment user via, for example, the standard interface 220 of FIG. 2. From step 302, the process 300 proceeds to step 304.

At step 304, the system adds a new application to the project. In a typical embodiment, the new application is added to the project responsive to the deployment user providing, for example, a name and a description for the new application. From step 304, the process 300 proceeds to step 306. At step 306, the system requests one or more deployment units for the new application from the deployment user. A deployment unit, as used herein, is an executable collection of application components and can include, for example, binary code. In various embodiments, the system may receive an application-server deployment unit as, for example, a web application archive (WAR) file, or a database deployment unit such as, for example, a .SQL file. From step 306, the process 300 proceeds to step 308. At step 308, the system receives the one or more deployment units from the deployment user. From step 308, the process 300 proceeds to step 310.

At step 310, the system requests that the deployment user select a deployment topology for the new application. The deployment topology typically specifies a number and configuration of virtual machines and physical and logical relationships among them. For example, as described in more detail with respect to FIG. 7, the deployment topology can allocate web-server, application-server, and database-server functionality to a single virtual machine or among multiple virtual machines. For purposes of this application, web-server, application-server, and database-server functionality may be referred to as a web layer, an application layer, and a database layer, respectively, of the new application. In a typical embodiment, as described with respect to FIG. 5, the system can provide an interface that allows the deployment user to select from among a plurality of deployment-topology options. In various embodiments, as described with respect to FIG. 7, the system also can allow the deployment user to create a new deployment topology. From step 310, the process 300 proceeds to step 312. At step 312, the system receives a selection of a deployment topology from the deployment user. From step 312, the process 300 proceeds to step 314.

At step 314, the system provides a list of VM templates to the deployment user. In a typical embodiment, the list includes VM templates for each of a plurality of cloud providers and is sorted by cloud provider. The list of VM templates can include, for example, VM templates from the VM templates 114 of FIG. 1 or the VM templates 214 of FIG. 2. From step 314, the process 300 proceeds to step 316. At step 316, the system receives a selection of one or more VM templates from the list provided at step 314. Typically, the system requires that each of the one or more VM templates correspond to a same cloud provider so that the selection constitutes selection of a cloud provider from among the plurality of cloud providers. In addition, the system typically requires that the one or more VM templates satisfy the deployment topology. Selection of VM templates will be described in more detail with respect to FIG. 8. From step 316, the process 300 proceeds to step 318.

At step 318, the system matches the one or more deployment units to the selected VM templates. For example, the system may match an application-server deployment unit to a VM template that provides application-server functionality. From step 318, the process 300 proceeds to step 320. At step 320, the system deploys the new application. In a typical embodiment, the deployment involves the system taking action to make the new application ready for use. An example of actions that can be taken at step 320 will be described with respect to FIG. 4. After step 320, the process 300 ends.

Figure 4:
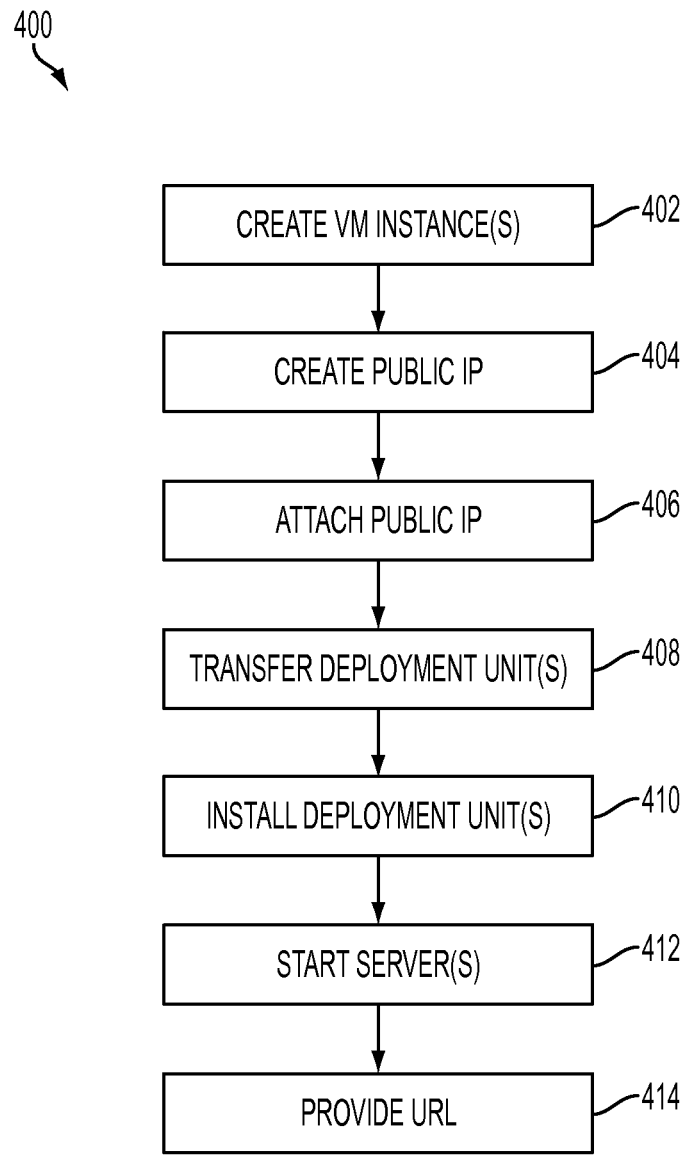
FIG. 4 illustrates a process for deploying a new application in a cloud environment of a selected cloud provider.

FIG. 4 illustrates a process 400 for deploying a new application such as, for example, the new application described with respect to the process 300 of FIG. 3, in a cloud environment of a selected cloud provider. The process 400 may be performed as all or part of step 320 of FIG. 3. In a typical embodiment, the process 400 is performed by a system that is in communication with a deployment user. The system may be, for example, the cloud-middleware platform 122 of FIG. 1 or the cloud-middleware platform 222 of FIG. 2. The process 400 begins at step 402.

At step 402, the system creates VM instances of VM templates such as, for example, the selected VM templates from step 316 of FIG. 3. The VM instances are typically created in the cloud environment using an adapter operable to call the cloud API of the selected cloud provider. The adapter can be, for example, selected from the adapters 116 of FIG. 1 or the adapters 216 of FIG. 2. From step 402, the process 400 proceeds to step 404. At step 404, the system creates a public IP address. The public IP address is typically created using the adapter described above. From step 404, the process 400 proceeds to step 406. At step 406, the system attaches the public IP address to, for example, a VM instance of the VM instances that will serve as web server. The public IP is typically attached using the adapter for the selected cloud provider. From step 406, the process 400 proceeds to step 408.

At step 408, the system transfers deployment units to the VM instances. In a typical embodiment, each deployment unit is transferred to those VM instances that are instances of a VM template to which the deployment unit has been matched. For example, the deployment units can be matched to the VM templates as described with respect to step 318 of FIG. 3. From step 408, the process 400 proceeds to step 410. At step 410, the system installs the deployment units on the VM instances. From step 410, the process 400 proceeds to step 412. At step 412, the system starts each respective server represented by the VM instances. From step 412, the process 400 proceeds to step 414. At step 414, the system provides a uniform resource locator (URL), for example, to the attached public IP, to the deployment user. After step 414, the process 400 ends.

Figure 5:
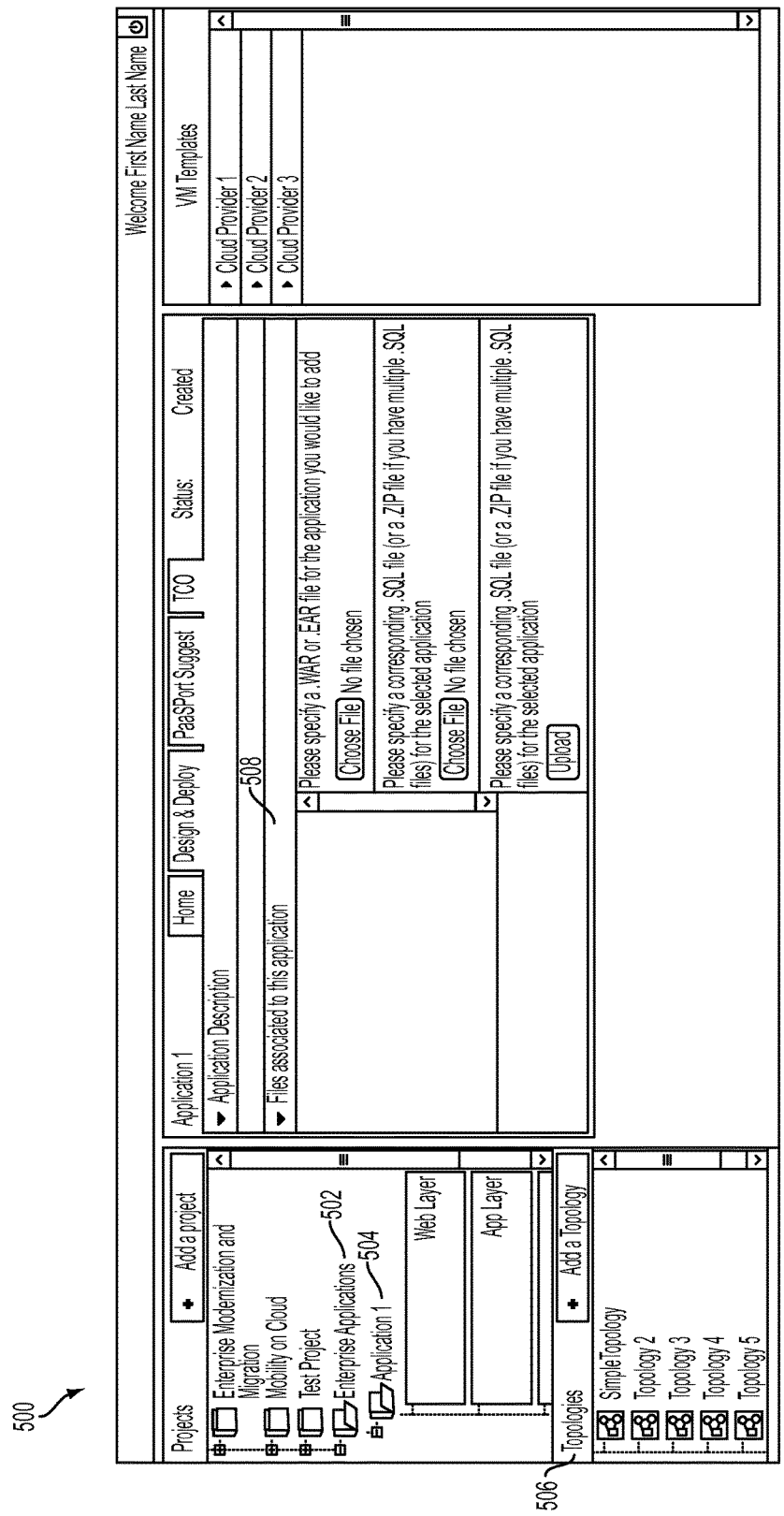
FIG. 5 illustrates an interface for deploying an application in a cloud environment.

FIG. 5 illustrates an interface 500 for deploying an application in a cloud environment. In a typical embodiment, the interface 500 is served to a deployment user by a system such as, for example, the cloud-middleware platform 122 of FIG. 1 or the cloud-middleware platform 222 of FIG. 2. By way of illustration, the interface 500 includes a project 502 labeled "Enterprise Applications" and an application 504 labeled "Application 1." In a typical embodiment, the project 502 has been created as described with respect to step 302 of FIG. 3 and the application 504 has been added to the project 502 as described with respect to step 304 of FIG. 3.

The interface 500 further includes a deployment-unit upload section 508. In a typical embodiment, the interface 500 can be used to request and receive deployment units related to the application 504, for example, as described with respect to steps 306-308 of FIG. 3. In addition, the interface 500 includes a plurality of deployment-topology options 506. In a typical embodiment, the system can allow the deployment user to select from the plurality of deployment-topology options 506 as described with respect to steps 310-312 of FIG. 3. As described in more detail with respect to FIG. 7, the system can also allow the deployment user to create a new deployment topology that will appear among the plurality of deployment-topology options 506.

Figure 6:
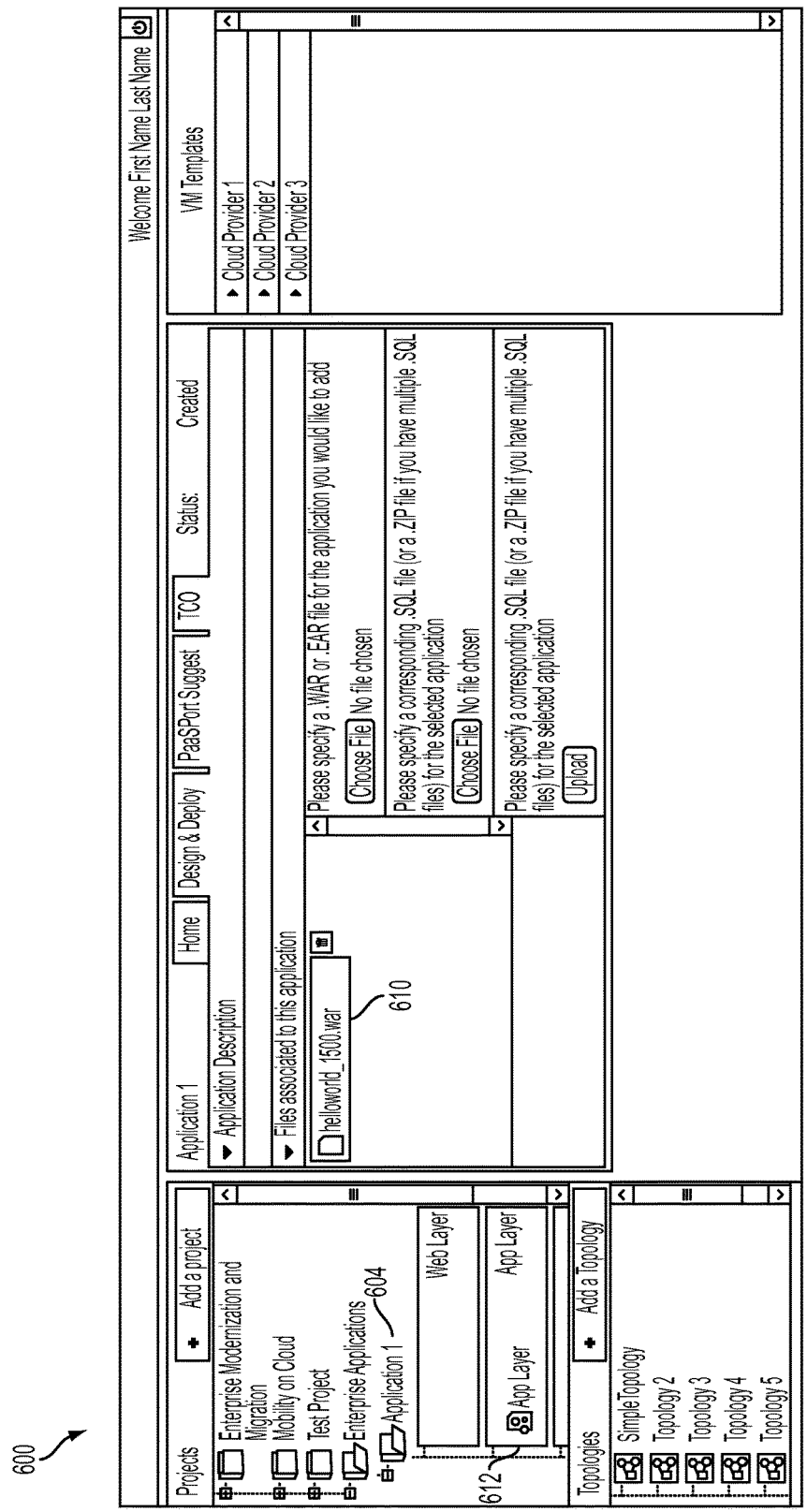
FIG. 6 illustrates an interface for deploying an application in a cloud environment.

FIG. 6 illustrates an interface 600 for deploying an application in a cloud environment. In a typical embodiment, the interface 600 is served to a deployment user by a system such as, for example, the cloud-middleware platform 122 of FIG. 1 or the cloud-middleware platform 222 of FIG. 2. The interface 600 is similar to the interface 500 of FIG. 6 except that, by way of illustration, the interface 600 depicts, in a deployment-unit upload section 608, a deployment unit 610 that has been received from the deployment user. The deployment unit 610 has be recognized by the system as an application layer 612 of an application 604.

Figure 7:
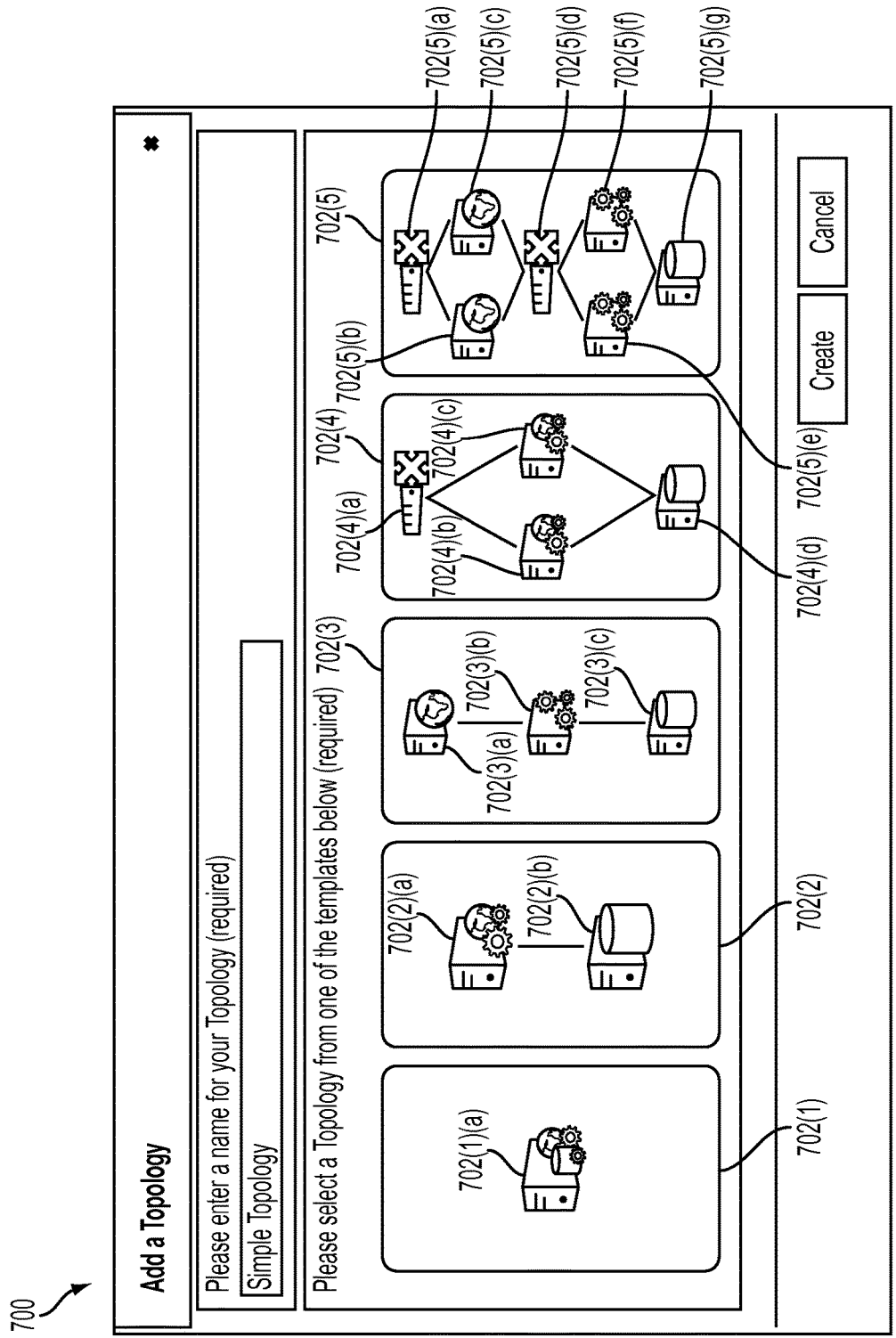
FIG. 7 illustrates an interface for creating a new deployment topology.

FIG. 7 illustrates an interface 700 for creating a new deployment topology. In a typical embodiment, the interface 700 is served to a deployment user by a system such as, for example, the cloud-middleware platform 122 of FIG. 1 or the cloud-middleware platform 222 of FIG. 2. In a typical embodiment, the interface 700 can be used to request and receive the new deployment topology, for example, as part of steps 310-312 of FIG. 3. The interface 700 depicts a deployment topology 702(1), a deployment topology 702(2), a deployment topology 702(3), a deployment topology 702(4), and a deployment topology 702(5). For convenient reference, the deployment topologies 702(1)-(5) may be collectively referenced as a plurality of deployment topologies 702. As shown, the interface 700 allows the deployment user to select a deployment topology from among the plurality of deployment topologies 702 and thereby create the selected deployment topology.

The deployment topology 702(1) is a one-VM configuration that utilizes a VM 702(1)(a). According to the deployment topology 702(1), the VM 702(1)(a) serves as web server, application server, and database server. The deployment topology 702(2) is a two-VM configuration that utilizes a VM 702(2)(a) and a VM 702(2)(b). According to the deployment topology 702(2), the VM 702(2)(a) serves as web server and application server while the VM 702(2)(b) serves as database server.

The deployment topology 702(3) is a three-VM configuration that utilizes a VM 702(3)(a), a VM 702(3)(b), and a VM 702(3)(c). According to the deployment topology 702(3), the VM 702(3)(a), the VM 702(3)(b), and the VM 702(3)(c) serve as web server, application server, and database server, respectively. The deployment topology 702(4) is a three-VM configuration that utilizes a VM 702(4)(b), a VM 702(4)(c), and a VM 702(4)(d). According to the deployment topology 702(4), the VM 702(4)(b) and the VM 702(4)(c) each serve as a combined application server and web server and are load balanced by a load balancer 702(4)(a). In addition, according to the deployment topology 702(4), the VM 702(4)(d) serves as database server.

The deployment topology 702(5) is a five-VM configuration that utilizes a VM 702(5)(b), a VM 702(5)(c), a VM 702(5)(e), a VM 702(5)(f), and a VM 702(5)(g). According to the deployment topology 702(5), the VM 702(5)(b) and the VM 702(5)(c) each serve as web servers that are load balanced by a load balancer 702(5)(a). In addition, according to the deployment topology 702(5), the VM 702(5)(e) and the VM 702(5)(f) each serve as application servers that are load balanced by a load balancer 702(5)(d). Moreover, in the deployment topology 702(5), the VM 702(5)(g) serves as a database server.

Figure 8:
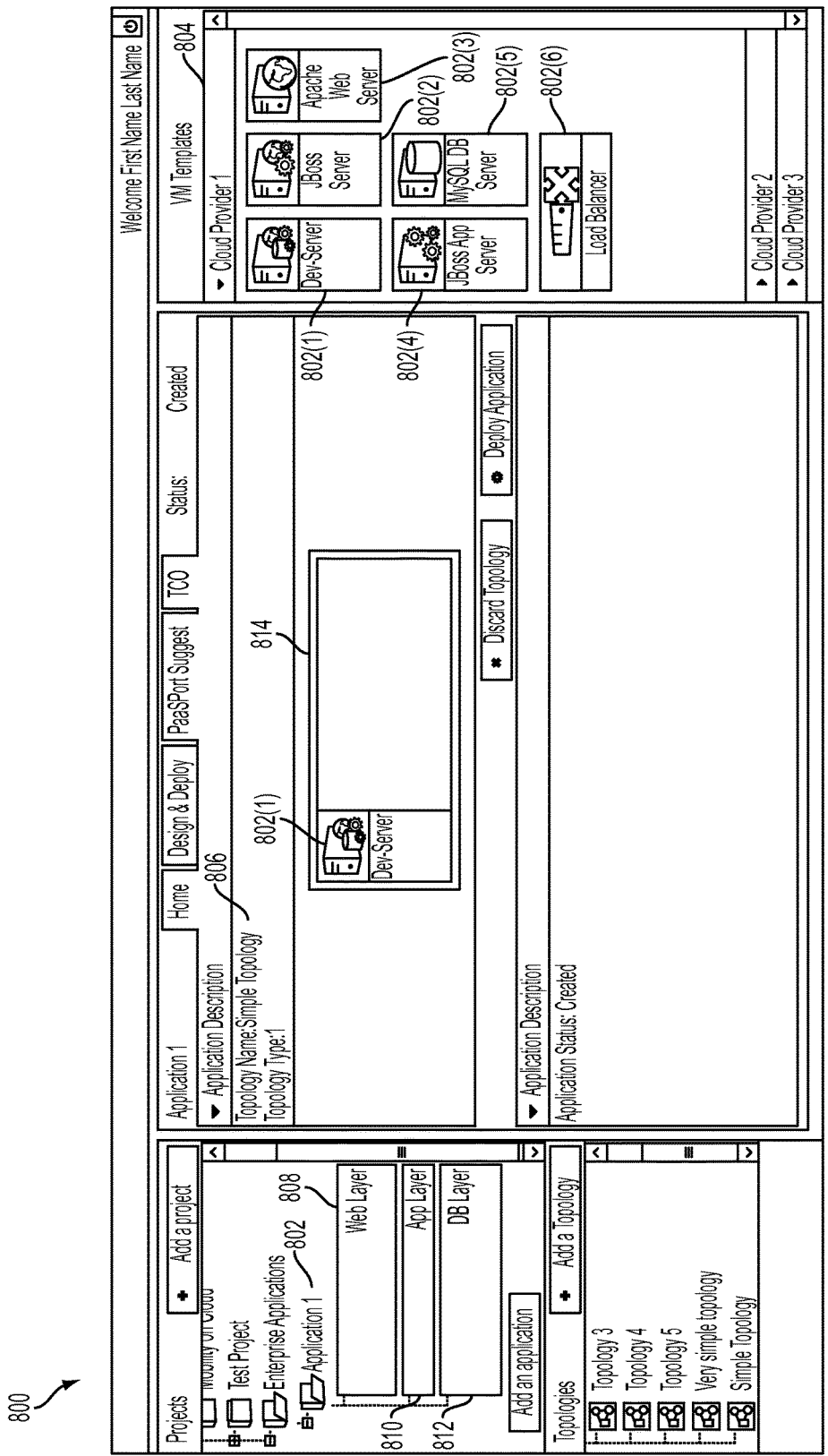
FIG. 8 illustrates an interface for selecting virtual-machine templates for an application.

FIG. 8 illustrates an interface 800 for selecting VM templates for an application 802. The application 802 includes a web layer 808, an application layer 810, and a database layer 812. The web layer 808, the application layer 810, and the database layer 812 each include one or more deployment units for a web server, an application server, and a database server, respectively. In a typical embodiment, the interface 600 is served to a deployment user by a system such as, for example, the cloud-middleware platform 122 of FIG. 1 or the cloud-middleware platform 222 of FIG. 2.

The interface 800 depicts VM templates 802(1)-802(6) for selection. For convenient reference, the VM templates 802(1)-802(6) may be referenced collectively as a list of VM templates 802. The list of VM templates 802 is shown to be associated with a cloud provider 804. In typical embodiment, the interface 800 is used to provide the list of VM templates to the deployment user as described, for example, with respect to step 314 of FIG. 3. As described with respect to FIG. 1, each VM template in the list of VM templates 802 is typically mapped to a virtual-machine type supported by the cloud provider 804.

The interface 800 depicts a deployment-topology section 806 that is representative of a deployment topology that has been selected, for example, as described with respect to steps 310-312 of FIG. 3. The deployment-topology section 806 includes a selected-VM-templates section 814 representing VM templates that have been selected, for example, as described with respect to steps 314-316 of FIG. 3. As shown, the deployment user has selected the VM template 802(1), for example, by dragging the VM template 802(1) onto the selected-VM-templates section 814.

As described with respect to step 318 of FIG. 3, the interface 800 further facilitates matching of the web layer 808, the application layer 810, and the database layer 812 to the selected VM templates. For example, a typical embodiment, the interface 800 allows the deployment user to initiate the matching by dragging each of the web layer 808, the application layer 810, and the database layer 812 onto one of the selected VM templates depicted in the selected-VM-templates section 814.

Figure 9:
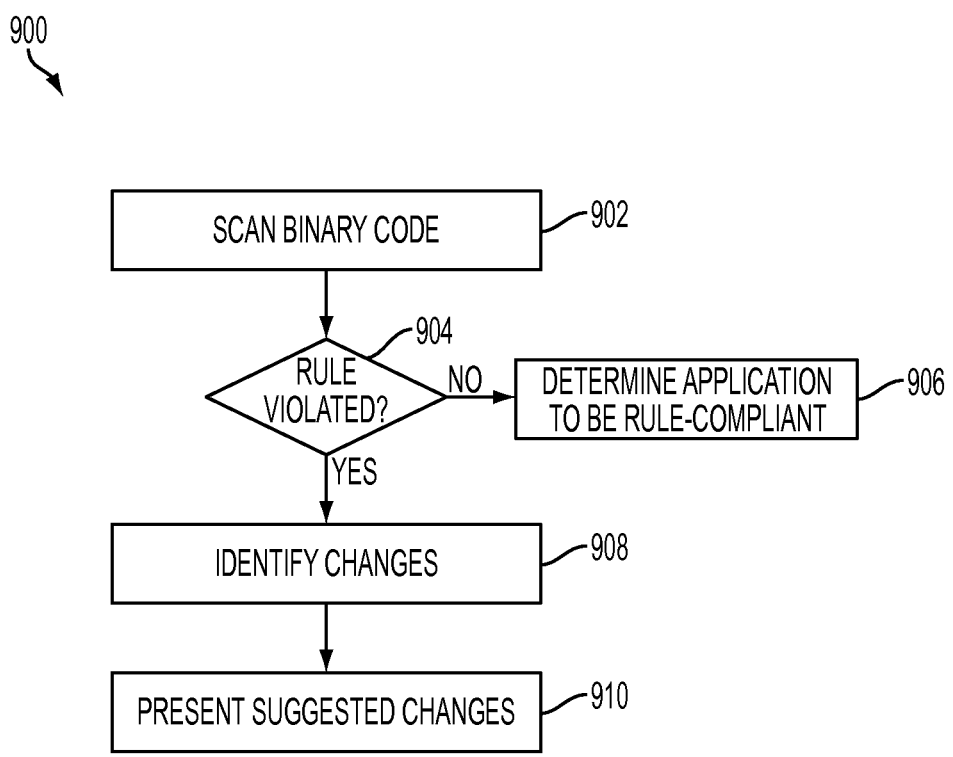
FIG. 9 illustrates a process for determining whether an application can be validly deployed on a system of a cloud provider.

FIG. 9 illustrates a process 900 for determining whether an application can be validly deployed on a system of a specified cloud provider. In a typical embodiment, the process 900 is performed by a system that is in communication with a deployment user. The system may be, for example, the cloud-middleware platform 122 of FIG. 1 or the cloud-middleware platform 222 of FIG. 2. In various embodiments, the process 900 may be performed as part of step 320 of the process 300 of FIG. 3. The process 900 begins at step 902.

At step 902, the system scans binary code that is included, for example, as part of deployment units provided by the deployment user. In a typical embodiment, the scan is performed according to rules that are stored in a database such as, for example, the database 118 of FIG. 1. In various embodiments, the rules typically specify conditions not permitted by the specified cloud provider. For example, a given rule could require that the application not utilize multithreading. From step 902, the process 900 proceeds to step 904. At step 904, the system determines whether any of the rules have been violated. If not, the process 900 proceeds to step 906. At step 906, the system determines the application to be rule-compliant. After step 906, the process 900 ends.

If it is determined at step 904 that at least one rule has been violated, the process 900 proceeds to step 908. At step 908, the system identifies one or more suggested changes for making the application rule-compliant. For example, if the at least one rule requires that the application not utilize multithreading, the one or more suggested changes could include a suggestion that the code be modified to eliminate multithreading. From step 908, the process 900 proceeds to step 910. At step 910, the system presents the one or more suggested changes to the deployment user. The deployment user can then make the suggested changes and resubmit corresponding deployment units to the system. After step 910, the process 900 ends.

Although various embodiments of the method and apparatus of the present invention have been illustrated in the accompanying Drawings and described in the foregoing Detailed Description, it will be understood that the invention is not limited to the embodiments disclosed, but is capable of numerous rearrangements, modifications and substitutions without departing from the spirit of the invention as set forth herein.

What is claimed is:
1. A method comprising:
  on a computer system comprising at least one server computer, maintaining stored deployment-topology options and stored virtual machine (VM) templates;

wherein the stored deployment-topology options each
   comprise information specifying:
   a number of VMs;
   an allocation of application-server functionality to one
      or more of the number of VMs; and
   an allocation of database-server functionality to one or
      more of the number of VMs;
wherein each of the stored VM templates:
   corresponds to a VM image that packages a pre-
      configured operating-system environment with
      application software operable to provide at least one
      service; and
   maps to a VM type supported by a particular cloud
      provider of a plurality of cloud providers;
receiving deployment units for an application to be
   deployed, the application comprising an application
   layer and a database layer, the deployment units com-
   prising an application file for the application layer and
   a database file for the database layer;
receiving, by the computer system, a selected deploy-
   ment-topology option, from the stored deployment-
   topology options, for the deployment units of the
   application;
responsive to the receiving of the selected deployment-
   topology option, providing, by the computer system, a
   list of VM templates selected from the stored VM
   templates;
wherein the list of VM templates is sorted by cloud
   provider and comprises, for each cloud provider of the
   plurality of cloud providers, a set of VM templates that
   satisfies:
   the number of VMs specified in the selected deploy-
      ment-topology option;
   the allocation of application-server functionality speci-
      fied in the selected deployment-topology option; and
   the allocation of database-server functionality specified
      in the selected deployment-topology option;
responsive to the providing, receiving, by the computer
   system, template selections that correspond to the set of
   VM templates for a selected cloud provider of the
   plurality of cloud providers, the template selections
   comprising:
   a first selected VM template for the allocation of
      application-server functionality specified in the
      selected deployment-topology option; and
   a second selected VM template for the allocation of
      database-server functionality specified in the
      selected deployment-topology option;
matching, by the computer system, the application file to
   the first selected VM template and the database file to
   the second selected VM template; and
deploying, by the computer system, the deployment units
   of the application on the selected cloud provider, the
   deploying comprising the computer system:
   creating, on the selected cloud provider, a first VM
      instance of the first selected VM template and a
      second VM instance of the second selected VM
      template;
   transferring the application file to the first VM instance
      and the database file to the second VM instance; and
   installing the application file on the first VM instance
      and the database file on the second VM instance.

2. The method of claim 1, wherein the creating comprises using an adapter operable to call an application programming interface of the selected cloud provider.

3. The method of claim 2, wherein the deploying comprises, for each of the deployment units:

creating a public IP address; and
attaching the public IP address to a corresponding VM
   instance.

4. The method of claim 3, wherein the deploying comprises, for each VM instance of the first VM instance and the second VM instance,
   starting at least one server represented by the VM
      instance.

5. The method of claim 4, wherein the deploying comprises providing a uniform resource locator (URL) to a deployment user.

6. The method of claim 1, wherein the receiving deployment units comprises receiving a web-server deployment unit.

7. The method of claim 1, comprising:
   maintaining a plurality of adapters, each adapter compris-
      ing an interface for communicating with an application
      programming interface (API) provided by at least one
      of the plurality of cloud providers; and
   wherein the deploying comprises communicating with a
      computer system of the selected cloud provider via at
      least one adapter of the plurality of adapters.

8. The method of claim 7, wherein each adapter is operable to translate a set of standard functionality provided by the computer system into one or more calls to the API.

9. The method of claim 1, wherein the stored VM templates establish a baseline definition of VMs that can be used to run a deployed application.

10. The method of claim 1, comprising calculating a total cost of ownership via pricing information maintained by the computer system for the selected cloud provider.

11. The method of claim 1, comprising scanning the deployment units via rules of the selected cloud provider.

12. The method of claim 11, comprising responsive to a determination that at least one rule is violated, identifying one or more suggested changes for making the application rule-compliant.

13. The method of claim 12, wherein the one or more suggested changes comprise one or more suggested code changes.

14. An information handling system, comprising:
   at least one server computer, wherein the at least one
      server computer is operable to:
      maintain stored deployment-topology options and
         stored virtual machine (VM) templates;
      wherein the stored deployment-topology options each
         comprise information specifying:
         a number of VMs;
         an allocation of application-server functionality to
            one or more of the number of VMs; and
         an allocation of database-server functionality to one
            or more of the number of VMs;
      wherein each of the stored VM templates:
         corresponds to a VM image that packages a pre-
            configured operating-system environment with
            application software operable to provide at least
            one service; and
         maps to a VM type supported by a particular cloud
            provider of a plurality of cloud providers;
      receive deployment units for an application to be
         deployed, the application comprising an application
         layer and a database layer, the deployment units
         comprising an application file for the application
         layer and a database file for the database layer;
      receive a selected deployment-topology option, from
         the stored deployment-topology options, for the
         deployment units of the application;

responsive to the receipt of the selected deployment-topology option, provide a list of VM templates selected from the stored VM templates;
wherein the list of VM templates is sorted by cloud provider and comprises, for each cloud provider of the plurality of cloud providers, a set of VM templates that satisfies:
the number of VMs specified in the selected deployment-topology option;
the allocation of application-server functionality specified in the selected deployment-topology option; and
the allocation of database-server functionality specified in the selected deployment-topology option;
responsive to the providing, receive template selections that correspond to the set of VM templates for a selected cloud provider of the plurality of cloud providers, the template selections comprising:
a first selected VM template for the allocation of application-server functionality specified in the selected deployment-topology option; and
a second selected VM template for the allocation of database-server functionality specified in the selected deployment-topology option;
match the application file to the first selected VM template and the database file to the second selected VM template; and
deploy the deployment units of the application on the selected cloud provider, the deployment comprising:
creation, on the selected cloud provider, a first VM instance of the first selected VM template and a second VM instance of the second selected VM template;
transfer of the application file to the first VM instance and of the database file to the second VM instance; and
installation of the application file on the first VM instance and of the database file on the second VM instance.

15. The information handling system of claim 14, comprising at least one database that stores cloud-provider settings.

16. The information handling system of claim 15, wherein the cloud-provider settings comprise at least one selected from the group consisting of:
pricing information comprising criteria for computing, for each cloud provider in the plurality of cloud providers, a total cost of ownership; and
deployment rules comprising rules for determining, for each cloud provider in the plurality of cloud providers, whether the application can be validly deployed.

17. The information handling system of claim 15, comprising:
wherein the cloud-provider settings comprise deployment rules for determining, for each cloud provider in the plurality of cloud providers, whether the application can be validly deployed; and
wherein the deployment comprises:
a scan of binary code via one or more of the deployment rules that are associated with the selected cloud provider; and
a determination of whether at least one rule has been violated.

18. The information handling system of claim 14, wherein the at least one server computer is operable to:
maintain a plurality of adapters, each adapter comprising an interface for communicating with an application programming interface (API) provided by at least one of the plurality of cloud providers; and
wherein the deployment comprises communicating with a computer system of the selected cloud provider via at least one adapter of the plurality of adapters.

19. The information handling system of claim 14, wherein the deployment comprises, for each deployment unit of the deployment units:
starting of at least one server represented by at least one of the first VM instance and the second VM instance; and
provision of a uniform resource locator (URL) to a deployment user.

20. A computer-program product comprising a non-transitory computer-readable storage medium having computer-readable program code embodied therein, the computer-readable program code adapted to be executed to implement a method comprising:
maintaining stored deployment-topology options and stored virtual machine (VM) templates;
wherein the stored deployment-topology options each comprise information specifying:
a number of VMs;
an allocation of application-server functionality to one or more of the number of VMs; and
an allocation of database-server functionality to one or more of the number of VMs;
wherein each of the stored VM templates:
corresponds to a VM image that packages a pre-configured operating-system environment with application software operable to provide at least one service; and
maps to a VM type supported by a particular cloud provider of a plurality of cloud providers;
receiving deployment units for an application to be deployed, the application comprising an application layer and a database layer, the deployment units comprising an application file for the application layer and a database file for the database layer;
receiving a selected deployment-topology option, from the stored deployment-topology options, for the deployment units of the application;
responsive to the receiving of the selected deployment-topology option, providing a list of VM templates selected from the stored VM templates;
wherein the list of VM templates is sorted by cloud provider and comprises, for each cloud provider of the plurality of cloud providers, a set of VM templates that satisfies:
the number of VMs specified in the selected deployment-topology option;
the allocation of application-server functionality specified in the selected deployment-topology option; and
the allocation of database-server functionality specified in the selected deployment-topology option;
responsive to the providing, receiving template selections that correspond to the set of VM templates for a selected cloud provider of the plurality of cloud providers, the template selections comprising:
a first selected VM template for the allocation of application-server functionality specified in the selected deployment-topology option; and
a second selected VM template for the allocation of database-server functionality specified in the selected deployment-topology option;

matching the application file to the first selected VM template and the database file to the second selected VM template; and deploying the deployment units of the application on the selected cloud provider, the deploying comprising:

creating, on the selected cloud provider, a first VM instance of the first selected VM template and a second VM instance of the second selected VM template;

transferring the application file to the first VM instance and the database file to the second VM instance; and installing the application file on the first VM instance and the database file on the second VM instance.

* * * * *